United States Patent
Mao et al.

[19]

[11] Patent Number: 6,037,755
[45] Date of Patent: Mar. 14, 2000

[54] SWITCHING CONTROLLER FOR A BUCK+BOOST CONVERTER AND METHOD OF OPERATION THEREOF

[75] Inventors: Hengchun Mao; Vijayan J. Thottuvelil, both of Plano, Tex.

[73] Assignee: Lucent Technologies Inc., Murray Hill, N.J.

[21] Appl. No.: 09/111,010

[22] Filed: Jul. 7, 1998

[51] Int. Cl.[7] .............................. G05F 1/10; G05F 1/56
[52] U.S. Cl. ........................................ 323/222; 323/282
[58] Field of Search ................................ 323/222, 223, 323/224, 282, 285, 299, 303; 363/101

[56] References Cited

U.S. PATENT DOCUMENTS

| | | | |
|---|---|---|---|
| 4,618,812 | 10/1986 | Kawakami | 323/224 |
| 4,729,088 | 3/1988 | Wong | 363/124 |
| 4,801,859 | 1/1989 | Dishner | 323/224 |
| 5,402,060 | 3/1995 | Erisman | 323/268 |
| 5,714,863 | 2/1998 | Hwang et al. | 320/1 |
| 5,831,418 | 11/1998 | Kitagawa | 323/222 |

*Primary Examiner*—Matthew Nguyen

[57] ABSTRACT

For use in a buck+boost DC/DC power converter having first and second switches, a switching controller, a method of controlling the first and second switches and buck+boost DC/DC power converters employing the switching controller or the method. In one embodiment, the switching controller includes: (1) a regulation circuit that provides a drive signal and (2) a drive signal generator, coupled to the regulation circuit, that generates a pulse of fixed duration based on the drive signal and provides the pulse and the drive signal to the first and second switches. In another embodiment, the switching controller further includes a comparison circuit that compares an input voltage with an output voltage and generates a control signal based thereon to a drive signal generator that routes a pulse and a drive signal to the first and second switches.

30 Claims, 5 Drawing Sheets under the Title 6,037,755

SWITCHING CONTROLLER FOR A BUCK+BOOST CONVERTER AND METHOD OF OPERATION THEREOF

TECHNICAL FIELD OF THE INVENTION

The present invention is directed, in general, to power conversion and, more specifically, to a switching controller for a buck+boost power converter that provides smooth transitions between the buck mode and the boost mode.

BACKGROUND OF THE INVENTION

Regulated DC power supplies are typically needed for most analog and digital electronic systems. Two major categories of regulated DC power supplies are linear power supplies and switching power supplies. Generally, in linear power supplies, a transistor (operating in its active region) is connected in series with an input voltage source and the voltage drop across the transistor is automatically adjusted to maintain an output voltage at a desired level.

In switching power supplies, transformation of DC voltage from one level to another is accomplished typically by means of DC/DC converter circuits, such as step-down (buck) or step-up (boost) converter circuits. Solid-state devices, such as transistors, are operated as switches (either completely ON or completely OFF) within these switching converters. Since the power devices are not required to operate in their active region, this mode of operation results in lower power dissipation. Furthermore, increasing switching speeds, higher voltage and current ratings of these power devices are some of the advantages that have increased the popularity of switching power supplies.

There are applications where a regulated output voltage of a power converter is required to vary between the minimum and maximum values of the power converter's input voltage supply, with no isolation needed. One example of such an application is in wireless communication base stations, wherein a signal amplifier typically requires a 28 volts regulated DC voltage off an input voltage source that varies from 20 volts to 30 volts. A preferred power converter topology for these applications is a step-down/up or buck-boost converter. The conventional buck-boost converter or its derived topologies are generally not practical due to their high voltage/current stresses. Instead, a buck+boost converter can be obtained by the cascade connection of two basic converters: a step-down converter, or "buck circuit," followed by a step-up converter or "boost circuit."

A conventional method of controlling the buck+boost converter is to operate the converter either in a buck or boost mode, depending on whether the input voltage is above or below the required output voltage. The buck+boost converter is configured to operate as a buck or boost converter by selectively controlling the operation of switches within the buck+boost converter's circuit. Operation of the buck+boost converter in the buck mode is accomplished by keeping a switch in the "boost circuit" in its non-conducting, or OFF, state and switching a switch in the "buck circuit," using pulse-width-modulation (PWM) control, when the input voltage is above the required output voltage. Operation of the buck+boost converter in the boost mode, on the other hand, is achieved by keeping the buck circuit's switch ON, i.e., conducting, at all times and controlling the switching of the boost circuit's switch, with PWM control, to regulate the output voltage.

However, with the above-described control scheme, if the input voltage is close to the output voltage, control accuracy degrades. Specifically, in the mode transition region where the converter's input and output voltages are about the same value, the control scheme cannot regulate the output voltage smoothly.

Accordingly, what is needed in the art is an improved control method for buck+boost converters that mitigates the above-described limitations and, more particularly, offers enhanced control accuracy in the mode transition region.

SUMMARY OF THE INVENTION

To address the above-discussed deficiencies of the prior art, the present invention provides a switching controller for use in a buck+boost DC/DC power converter. In one embodiment, the switching controller includes: (1) a regulation circuit that provides a drive signal and (2) a drive signal generator, coupled to the regulation circuit, that generates a pulse of fixed duration based on the drive signal and provides the pulse and the drive signal to the first and second switches. In another embodiment, the switching controller further includes a comparison circuit that compares an input voltage with an output voltage and generates a control signal based thereon to a drive signal generator that routes a pulse and a drive signal to the first and second switches.

The present invention discloses a novel switching controller for a buck+boost power converter that is required to operate in both the conventional buck and boost modes. The switching controller provides a smooth transition from the buck mode to the boost mode and vice versa by controlling the first and second switches in tandem. The smoother transitions ultimately result in better regulation of the output voltage, particularly about the point at which modes are changed (the "mode transition region").

In one embodiment of the present invention, the regulation circuit is a pulse-width-modulation (PWM) controller. Those skilled in the art should readily appreciate that while a PWM controller may serve as the controller for providing drive signals, other control circuits are within the broad scope of the present invention.

In one embodiment of the present invention, the switching controller includes a pulse circuit, which may be a monostable multivibrator. The monostable multivibrator, also commonly known as a "one-shot," is triggered, in one embodiment, by a rising edge of the drive signal to generate a pulse of fixed duration. Alternatively, the monostable multivibrator may, in another embodiment, be triggered by a trailing edge of the drive signal.

In one embodiment of the present invention, the switching control scheme employed by the switching controller turns both first and second switches ON simultaneously. In another embodiment, the first and second switches are turned ON sequentially. Of course, these switching control schemes are merely illustrative and other switching control sequences are within the broad scope contemplated by the present invention.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the concepts and the specific embodiments disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 3C illustrates an exemplary switching scheme wherein first and second switches are turned ON sequentially with the second switch turning ON after the first switch has turned OFF and turning OFF after the first switch has turned ON;

FIG. 3D illustrates an exemplary switching scheme wherein first and second switches are turned ON sequentially with the first switch turning ON after the second switch has turned OFF and turning OFF after the second switch has turned ON;

DETAILED DESCRIPTION

Figure 1:
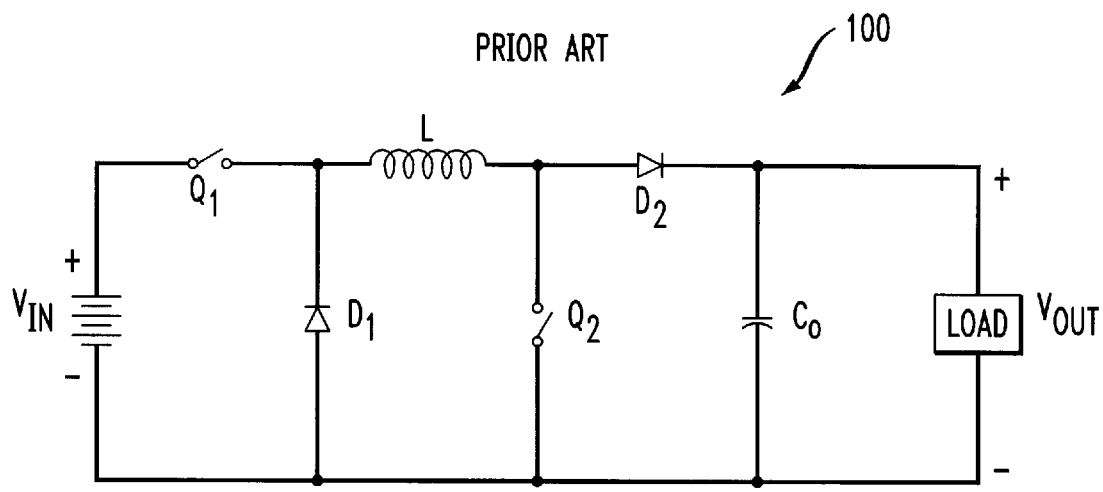
FIG. 1 illustrates a schematic diagram of a conventional buck+boost power converter.

Referring initially to FIG. 1, illustrated is a schematic diagram of a conventional buck+boost power converter 100. In its fundamental circuit configuration, the converter 100 includes first and second switches Q1, Q2, first and second diodes D1, D2, an inductor L and an output capacitor Co. The buck+boost converter 100, as its name implies, is constructed from two basic converter topologies: a step-down (buck) converter and a step-up (boost) converter. This converter topology is employed advantageously in regulated DC power supplies for which an output voltage Vout can be higher or lower than an input voltage Vin.

The converter 100 is operated in a buck mode when the regulated output voltage Vout is below the input voltage Vin. In this operational mode, the switch Q2 is kept OFF, i.e., non-conducting, at all times. The switching of the switch Q1 is typically accomplished with a PWM controller (not shown). During the interval when the switch Q1 is ON, i.e., conducting, the diode D1 becomes reverse biased, the diode D2 is forward-biased and the input Vin provides energy to a load as well as to the inductor L. During the interval when the switch Q1 is OFF, the inductor current flows through the first and second diodes D1, D2, transferring some of the energy stored in the inductor L to the load.

The converter 100 is operated in a boost mode when the regulated output voltage Vout is higher than the input voltage Vin. To operate in the boost mode, the first switch Q1 is kept ON at all times and the second switch Q2 is placed under PWM control. During the interval when the second switch Q2 is ON, the second diode D2 is reverse-biased (isolating the output from the input) and the input Vin supplies energy to the inductor L. During the interval when the second switch Q2 is OFF, the load receives energy from the inductor L as well as from the input Vin.

As discussed previously, with the above-described control scheme, if the input voltage Vin is close to the output voltage Vout, the control performance degrades. Specifically, in the mode transition region where the converter's input voltage Vin and output voltage Vout are about the same value, the control scheme cannot regulate the output voltage Vout smoothly. Furthermore, two control circuits are needed to regulate the output voltage; one in the buck mode and the other in the boost mode.

The present invention discloses a novel switching controller for a buck+boost power converter that is required to operate in both the buck and boost modes. The switching controller provides a smooth transition from the buck mode to the boost mode and vice versa. The smoother transitions ultimately result in better regulation of the output voltage. Additionally, only one controller is required regardless of whether the input voltage is lower or higher than the output voltage.

Figure 2:
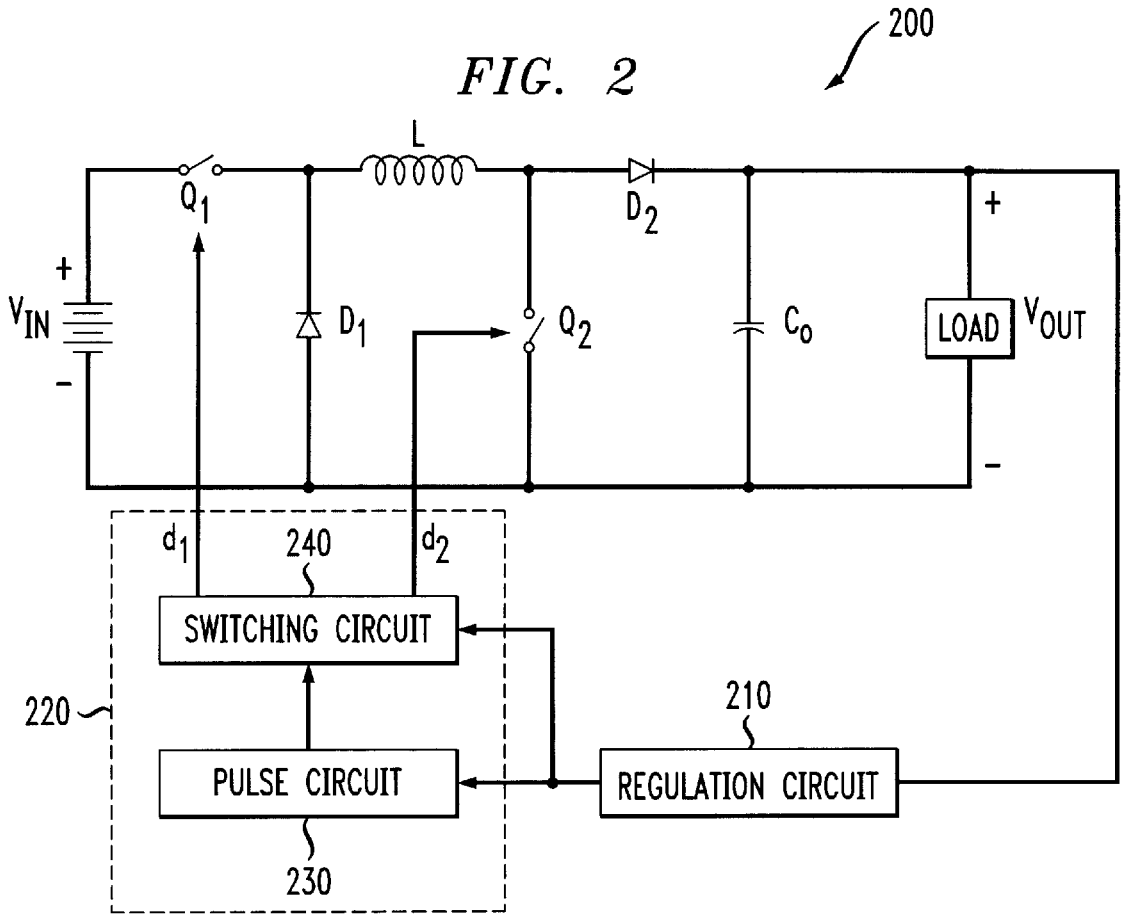
FIG. 2 illustrates an embodiment of a buck+boost DC/DC power converter constructed according to the principles of the present invention.

Turning now to FIG. 2, illustrated is an embodiment of a buck+boost DC/DC power converter 200 according to the principles of the present invention. The converter 200 includes first and second switches Q1, Q2 coupled to first and second diodes D1, D2. The first and second switches Q1, Q2, in an advantageous embodiment, are metal-oxide-semiconductors field effect transistors (MOSFETs). Those skilled in the art should readily appreciate that in other advantageous embodiments, other switching devices, such as insulated gate bipolar transistors (IGBTs), may also be advantageously employed. An inductor L is also shown coupled to the first and second diodes D1, D2. Also shown in the illustrated embodiment is an input voltage source Vin coupled to the first switch Q1. A regulation circuit 210 senses an output voltage Vout and provides a gate drive signal to a drive signal generator 220. In an advantageous embodiment, the regulation circuit 210 includes a PWM controller. Those skilled in the art are familiar with the construction and operation of PWM controllers and their operation will hereinafter not be described in detail. An output capacitor Co is also shown coupled across a load to filter the output DC waveform.

The gate drive generator 220 includes a pulse circuit 230 that provides a single pulse (of a fixed duration in the illustrated embodiment) based on the gate drive signal from the regulation circuit 210. It should be readily apparent to those skilled in the art that the pulse circuit 230, in a preferred embodiment, may be a monostable multivibrator. The single pulse generated by the pulse circuit 230, along with the gate drive signal from the regulation circuit 210, are provided to a switching circuit 240 (also part of the drive signal generator 220). The switching circuit 240, which is essentially a logic switching circuit, routes these signals to the appropriate switches, i.e., first and second switches Q1, Q2, based on the switching control scheme employed.

While the drive signal generator 220 is illustrated as including a switching circuit 240 and a pulse circuit 230, those skilled in the art will understand that the functions of the drive signal generator 220 can be carried out with other components or systems, including discrete and integrated circuitry, analog and digital circuitry, computing machinery and any software or firmware that may be associated therewith. Those skilled in the art will know how to embody switching, comparing and pulse generating operations in a variety of different physical apparatus. All such apparatus are within the broad scope of the present invention.

A variety of switching control schemes may be employed to provide a smooth transition between the buck to boost modes and vice versa. The various switching control schemes that may be advantageously employed may be described in greater detail by referring to exemplary switching waveforms in FIGS. 3A through 3D, with continuing reference to FIG. 2.

Figure 3A:
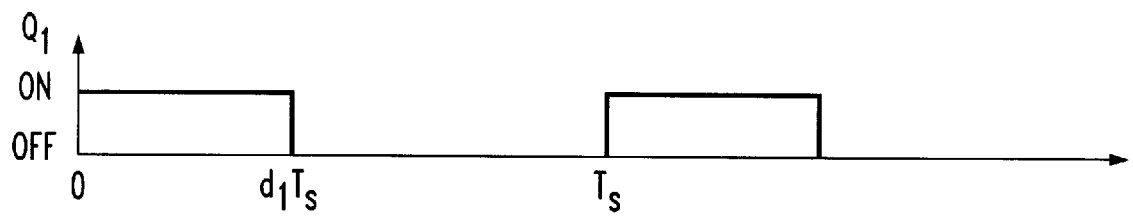
FIG. 3A illustrates an exemplary switching scheme wherein first and second switches are turned ON simultaneously and the first switch is turned OFF before the second switch.
Figure 3A:
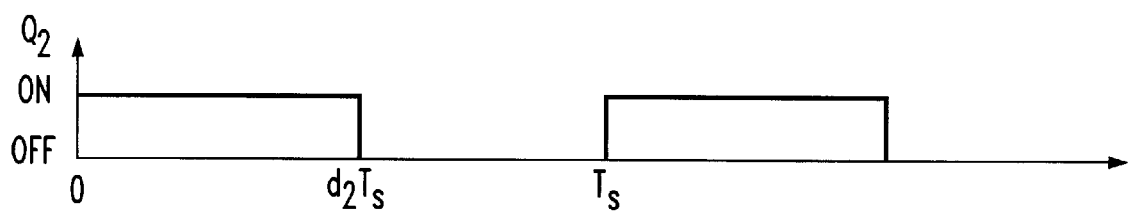
Figure 3B:
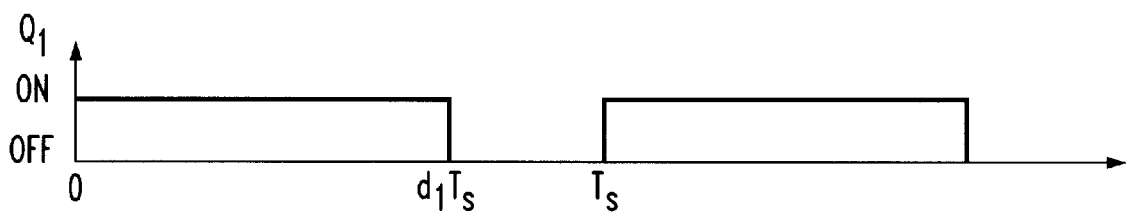
FIG. 3B illustrates an exemplary switching scheme wherein first and second switches are turned ON simultaneously and the second switch is turned OFF before the first switch.
Figure 3B:
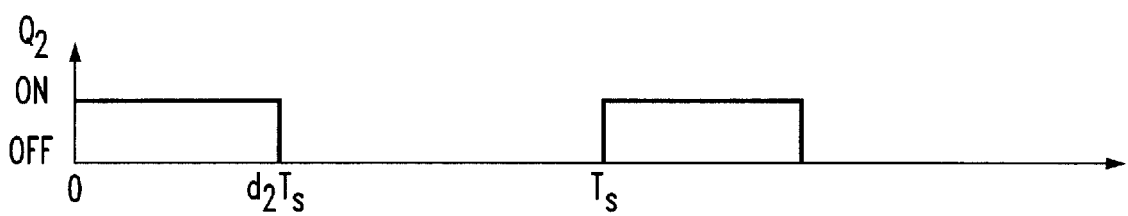
Figure 3C:
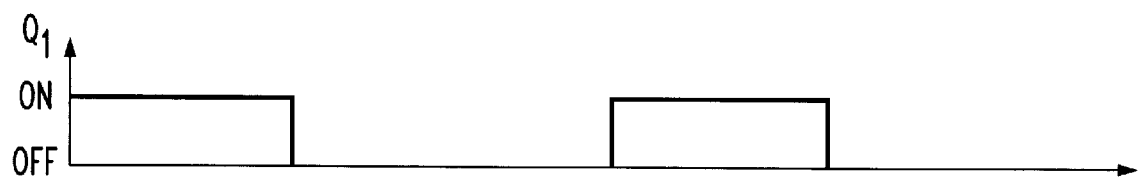
Figure 3C:
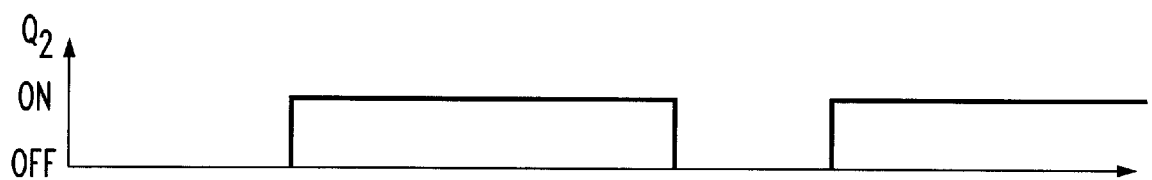
Figure 3D:
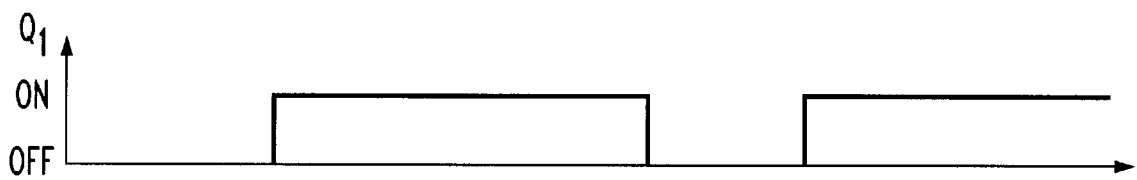
Figure 3D:
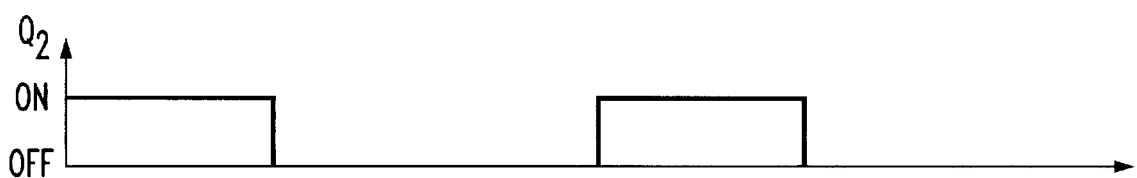

Turning now to FIGS. 3A, 3B, 3C and 3D, illustrated are exemplary switching waveforms that control the switching of the first and second switches Q1, Q2 illustrated in FIG. 2. More specifically, FIG. 3A illustrates an exemplary switching scheme wherein the first and second switches Q1, Q2 are turned ON simultaneously and the first switch Q1 is turned OFF before the second switch Q2. FIG. 3B illustrates an exemplary switching scheme wherein the first and second switches Q1, Q2 are turned ON simultaneously and the second switch Q2 is turned OFF before the first switch Q1. FIG. 3C illustrates an exemplary switching scheme wherein the first and second switches Q1, Q2 are turned ON sequentially with the second switch Q2 turning ON after the first switch Q1 has turned OFF and turning OFF after the first switch Q1 has turned ON. FIG. 3D illustrates an exemplary switching scheme wherein the first and second switches Q1, Q2 are turned ON sequentially with the first switch Q1 turning ON after the second switch Q2 has turned OFF and turning OFF after the second switch Q2 has turned ON.

Assuming that the inductor L current is continuous, the relationship between the input voltage Vin, output voltage Vout and the switching duty cycles of the first and second switches Q1, Q2 is given by:

$$Vout/Vin = d1/(1-d2) \quad (1)$$

where d1 and d2 are the duty cycles of the first and second switches Q1, Q2, respectively.

It can be seen from equation (1) above that if d2 is kept fixed and d1 is varied, a linear relationship between Vout and d1 is obtained for a fixed Vin. The resulting switching waveforms are shown in FIG. 3A. Under this switching control scheme, the drive signal from the regulation circuit 210 is routed to the first switch Q1 and a fixed duration pulse is routed from the pulse circuit 230 to the second switch Q2. It should be noted that this linear relationship between Vout and d1 is similar to that found in a conventional buck converter and allows the design of the compensation, i.e., control scheme, to be relatively straightforward.

In an advantageous embodiment, the pulse circuit 230 is "triggered" by a rising edge of the drive signal from the regulation circuit 210. Alternatively, the first and second switches Q1, Q2 are turned ON sequentially as illustrated in FIG. 3C. With this switching control scheme, the pulse circuit 230 generates a pulse of fixed duration when it is triggered by the trailing edge of the drive signal from the regulation circuit 210.

On the other hand, if d2 is varied and d1 is fixed at a relatively high value, e.g., 0.8 to 0.9, the control scheme becomes more complex (similar to that in a conventional boost converter). Turning the first and second switches Q1, Q2 ON at the same time or alternately results in the switching waveforms illustrated in FIGS. 3B and 3D, respectively. The implementation of the switching control schemes illustrated in FIGS. 3B and 3D is similar to the implementation of the switching control schemes illustrated in FIGS. 3A and 3C described above. These relatively more complex control schemes, however, result in a smaller inductor current and current ripple through the inductor L, when compared to the previous switching schemes. The lower inductor current may be desirable under certain conditions such as in relatively high power applications.

Figure 4:
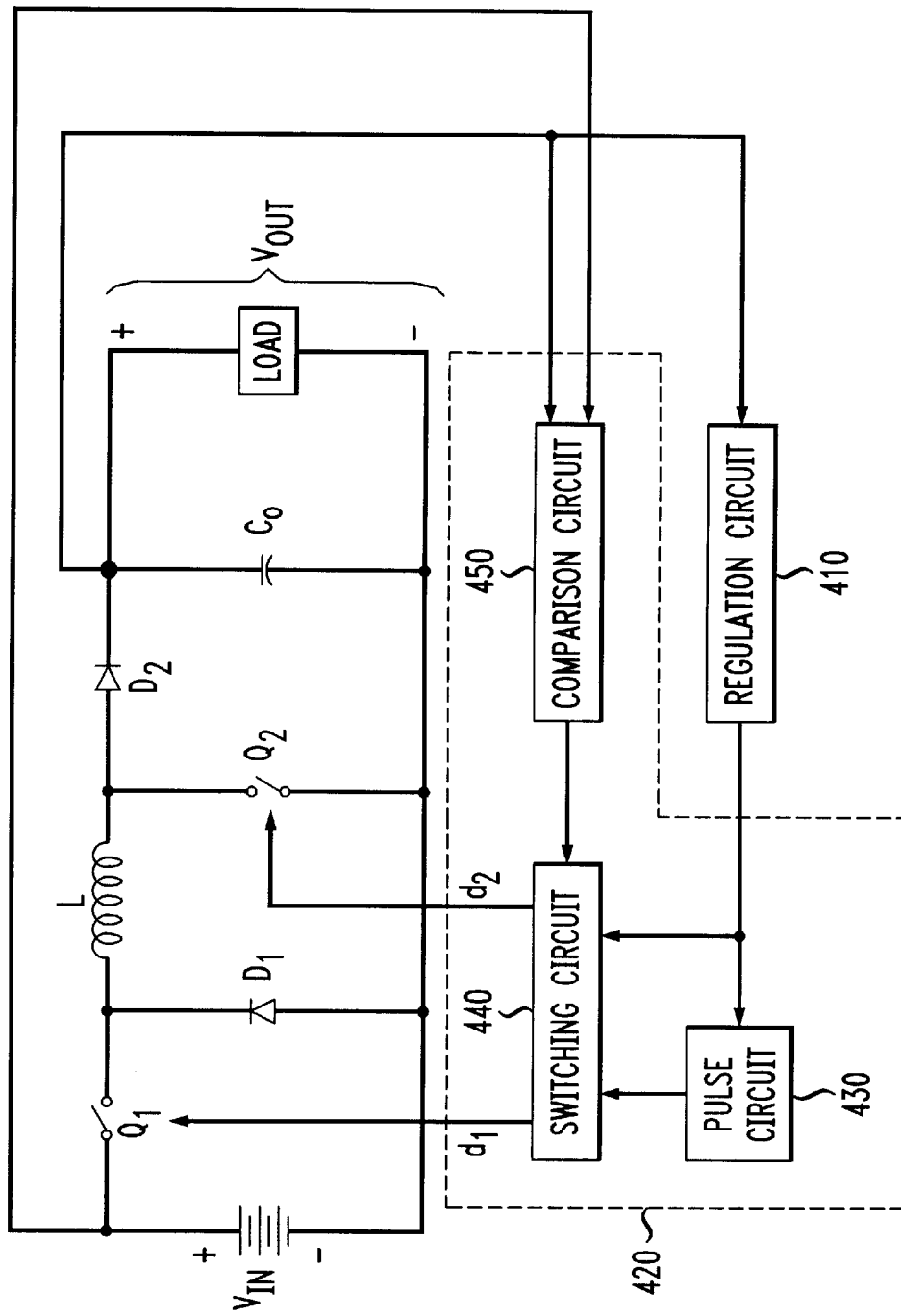
FIG. 4 illustrates another embodiment of a buck+boost DC/DC power converter according to the principles of the present invention.

Turning now to FIG. 4, illustrated is another embodiment of a buck+boost DC/DC power converter 400 according to the principles of the present invention. The converter 400 is analogous to the converter 200 illustrated in FIG. 2. The converter 400, however, further includes a comparison circuit 450 that is coupled to a switching circuit 440. The comparison circuit 450 senses an input voltage Vin and an output voltage Vout and generates a comparison, or control, signal to "configure" the switching circuit 440. In an advantageous embodiment, the comparison circuit 450 includes an operational amplifier (op-amp) configured as a comparator. The converter's 400 different operational modes, i.e., buck, boost or transition, may be further illuminated by referring to FIG. 5, with continuing reference to FIG. 4.

Figure 5:
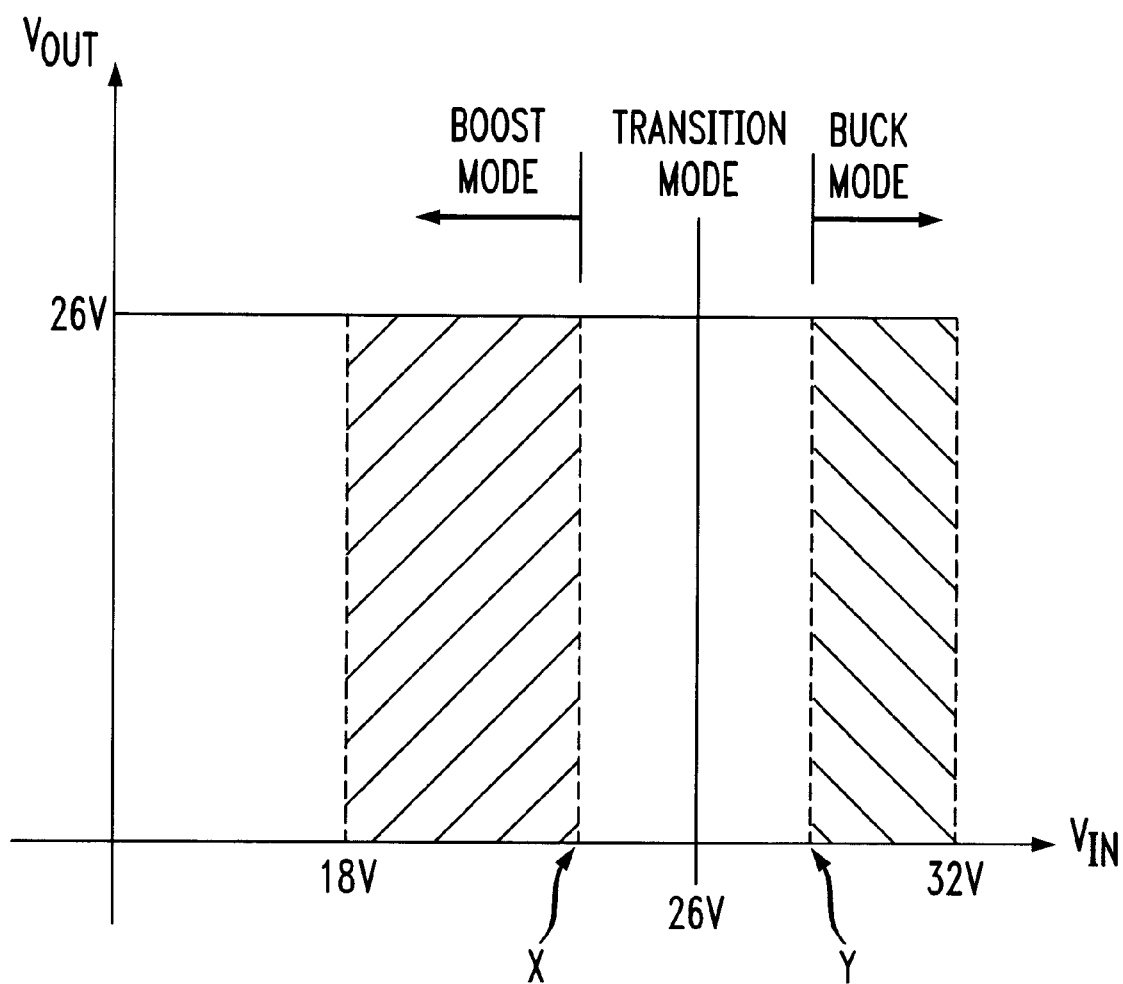
FIG. 5 illustrates an exemplary graph of an input voltage Vin versus an output voltage Vout.

Turning now to FIG. 5, illustrated is an exemplary graph 500 of input voltage Vin versus output voltage Vout. The graph 500 is based on an exemplary desired output voltage Vout of 26 volts with the input voltage Vin ranging from a lower threshold value of 18 volts to an upper threshold value of 32 volts. When the comparison circuit 450 determines that the input voltage Vin is between 18 volts and a point X, e.g., 24 V, the control (comparison) signal configures the internal logic circuit of the switching circuit 440 to route the drive signal from the regulation circuit 410 to the second switch Q2. At the same time, the switching circuit 440 generates another signal to keep the first switch Q1 ON at all times. The switching of the first and second switches Q1, Q2 defines the conventional boost mode of operation as discussed previously.

If, however, the comparison circuit 450 determines that the input voltage Vin is greater than a point Y, e.g., 28 V, the resulting control signal configures the internal logic circuit of the switching circuit 440 to route the drive signal from the regulation circuit 410 to the first switch Q1. Concurrently, the switching circuit 440 does not generate another signal to the second switch Q2, i.e., the second switch Q2 is OFF. It should be readily apparent to those skilled in the art that this is the conventional buck mode switching scheme described previously. The variety of switching control schemes illustrated in FIGS. 3A through 3D may be employed in the transition mode, i.e., between points X and Y, to provide a smooth transition between the buck to boost modes and vice versa.

Although the present invention and its advantages have been described in detail, those skilled in the art should understand that they can make various changes, substitutions and alterations herein without departing from the spirit and scope of the invention in its broadest form.

What is claimed is:

1. For use in a buck+boost DC/DC power converter having first and second switches, a switching controller, comprising:

a regulation circuit that provides a drive signal; and a drive signal generator, coupled to said regulation circuit that generates a pulse of fixed duration based on said drive signal and provides said pulse and said drive signal to said first and second switches.

2. The switching controller as recited in claim 1 wherein said regulation circuit is a pulse-width-modulation (PWM) controller.

3. The switching controller as recited in claim 1 wherein said drive signal generator comprises a monostable multivibrator.

4. The switching controller as recited in claim 1 wherein said drive signal generator generates said pulse based on a rising edge of said drive signal.

5. The switching controller as recited in claim 1 wherein said drive signal generator generates said pulse based on a trailing edge of said drive signal.

6. The switching controller as recited in claim 1 wherein said drive signal generator turns said first and second switches ON simultaneously.

7. The switching controller as recited in claim 1 wherein said drive signal generator turns said first and second switches ON sequentially.

8. A method of controlling a buck+boost DC/DC power converter having first and second switches, comprising:
 providing a drive signal;
 generating a pulse of fixed duration based on said drive signal; and
 routing said pulse and said drive signal to said first and second switches.

9. The method as recited in claim 8 wherein said providing said drive signal comprises providing a pulse-width-modulated (PWM) drive signal.

10. The method as recited in claim 8 wherein said generating said pulse comprises generating said pulse with a monostable multivibrator.

11. The method as recited in claim 8 wherein said generating said pulse comprises generating said pulse based on a rising edge of said drive signal.

12. The method as recited in claim 8 wherein said generating said pulse comprises generating said pulse based on a trailing edge of said drive signal.

13. The method as recited in claim 8 wherein said routing said pulse and said drive signal comprises turning said first and second switches ON simultaneously.

14. The method as recited in claim 8 wherein said routing said pulse and said drive signal comprises turning said first and second switches ON sequentially.

15. A buck+boost DC/DC power converter, comprising:
 first and second switches, said first switch coupled in series to an input voltage source;
 first and second diodes coupled to said first and second switches;
 an inductor and an output capacitor coupled to said first and second diodes;
 a regulation circuit that senses an output voltage of said power converter and generates a drive signal in response thereto; and
 a drive signal generator, coupled to said regulation circuit, that generates a pulse of fixed duration based on said drive signal and provides said pulse and said drive signal to said first and second switches.

16. For use in a buck+boost DC/DC power converter having first and second switches, a switching controller comprising:
 a regulation circuit that provides a drive signal;
 a comparison circuit that compares input and output voltages of said power converter and generates a control signal based thereon;
 a pulse circuit, coupled to said regulation circuit, that generates a pulse based on said drive signal; and
 a switching circuit, coupled to said regulation circuit and said pulse circuit, that routes said pulse and said drive signal to said first and second switches based on said control signal.

17. The switching controller as recited in claim 16 wherein said regulation circuit is a pulse-width-modulation (PWM) controller.

18. The switching controller as recited in claim 16 wherein said pulse circuit is a monostable multivibrator.

19. The switching controller as recited in claim 16 wherein said pulse circuit is triggered by a rising edge of said drive signal.

20. The switching controller as recited in claim 16 wherein said pulse circuit is triggered by a trailing edge of said drive signal.

21. The switching controller as recited in claim 16 wherein said first and second switches are turned ON simultaneously.

22. The switching controller as recited in claim 16 wherein said first and second switches are turned ON sequentially.

23. For use in a buck+boost DC/DC power converter having first and second switches, a method for controlling the switching of said first and second switches, comprising:
 providing a drive signal;
 comparing input and output voltages of said power converter and generating a control signal based thereon;
 generating a pulse in response to said drive signal; and
 routing said pulse and said drive signal to said first and second switches based on said control signal.

24. The method as recited in claim 23 wherein said providing said drive signal comprises providing a pulse-width-modulated (PWM) drive signal.

25. The method as recited in claim 23 wherein said generating said pulse comprises generating said pulse with a monostable multivibrator.

26. The method as recited in claim 23 wherein said generating said pulse comprises generating said pulse based on a rising edge of said drive signal.

27. The method as recited in claim 23 wherein said generating said pulse comprises generating said pulse based on a trailing edge of said drive signal.

28. The method as recited in claim 23 wherein said routing said pulse and said drive signal comprises turning said first and second switches ON simultaneously.

29. The method as recited in claim 23 wherein said routing said pulse and said drive signal comprises turning said first and second switches ON sequentially.

30. A buck+boost DC/DC power converter, comprising:
 first and second switches, said first switch coupled in series to an input voltage source;
 first and second diodes coupled to said first and second switches;
 an inductor and an output capacitor coupled to said first and second diodes;
 a regulation circuit that senses an output voltage of said power converter and generates a drive signal in response thereto;
 a comparison circuit that compares an input voltage of said power converter to said output voltage and generates a control signal based thereon;
 a pulse circuit, coupled to said regulation circuit, that generates a pulse in response to said drive signal; and
 a switching circuit, coupled to said regulation circuit and said pulse circuit, that routes said pulse and said drive signal to said first and second switches based on said control signal.

* * * * *